(No Model.)
J. J. LEUZINGER.
CLOTHES LINE PULLEY.
No. 551,214. Patented Dec. 10, 1895.
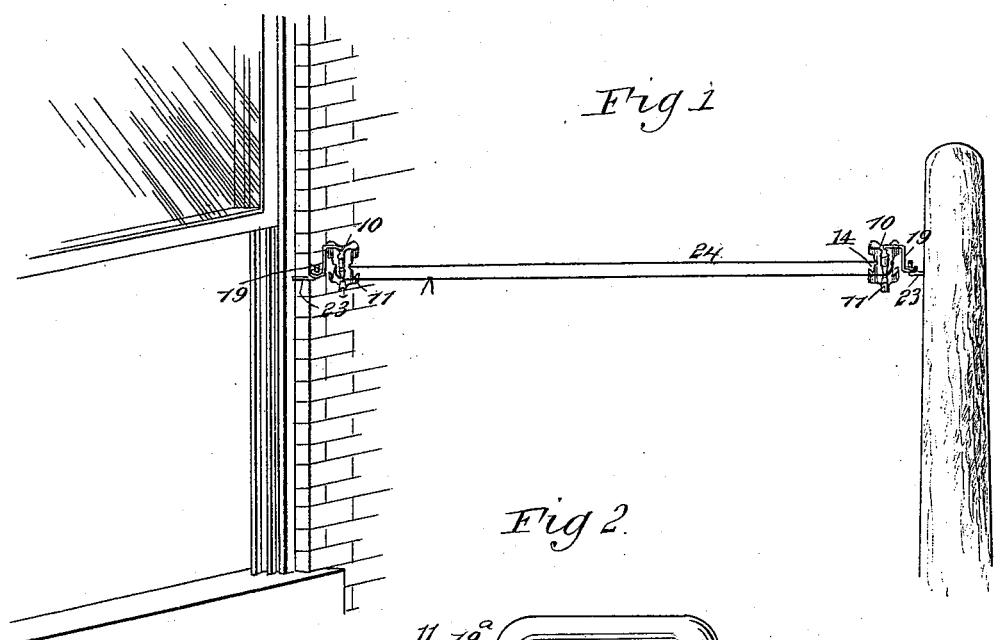
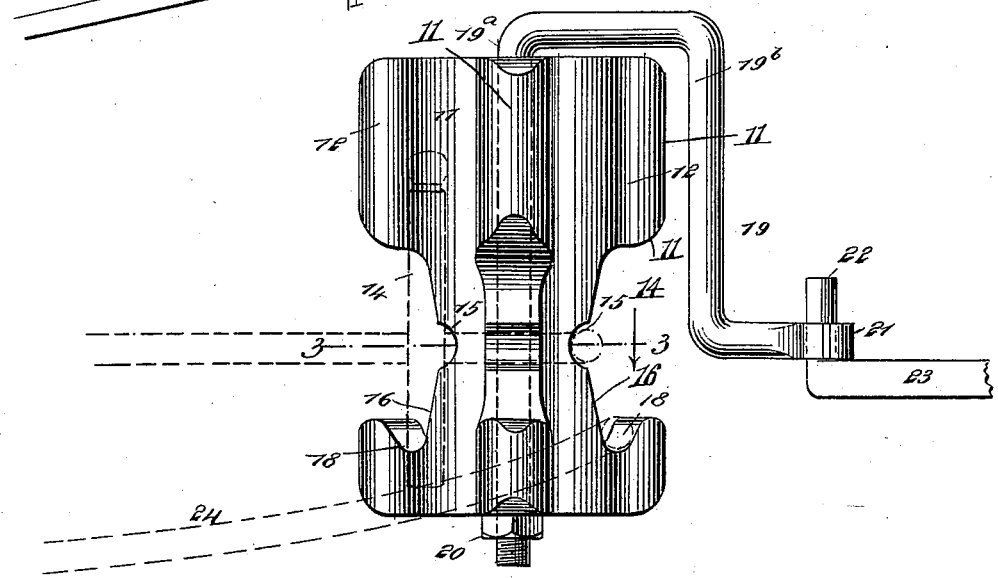
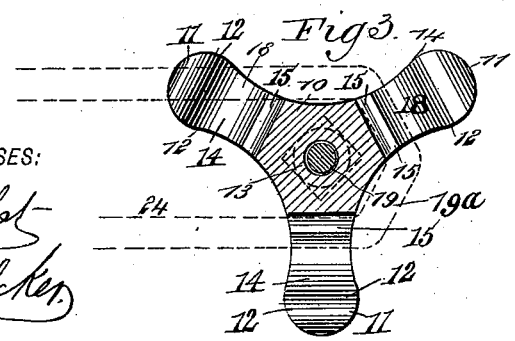
WITNESSES:
Paul Jahat
J. Fedr Acker
INVENTOR
J. J. Leuzinger
BY
Munn & Co
ATTORNEYS.

UNITED STATES PATENT OFFICE.

JOHAN JAKOB LEUZINGER, OF WEST NEW BRIGHTON, NEW YORK.

CLOTHES-LINE PULLEY.

SPECIFICATION forming part of Letters Patent No. 551,214, dated December 10, 1895.

Application filed February 20, 1895. Serial No. 539,080. (No model.)

*To all whom it may concern:*

Be it known that I, JOHAN JAKOB LEUZINGER, of West New Brighton, in the county of Richmond and State of New York, have invented a new and Improved Clothes-Line Pulley, of which the following is a full, clear, and exact description.

My invention relates to an improvement in clothes-line pulleys, and it has for its object to provide a pulley so constructed that the clothes-pins on a line may be readily passed around the pulley without being forced from the line, or from clamping engagement with the clothes on the line.

Another object of the invention is to so construct the pulley that the expansion and contraction of the line will be automatically provided for.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a view illustrating the application of two of the improved pulleys. Fig. 2 is a side elevation of one of the pulleys, and Fig. 3 is a diametrical section taken substantially on the line 3 3 of Fig. 2.

The pulley is preferably made of a hard wood, although other material may be used if desired.

The pulley comprises a hub 10 and wings 11 projected from the said hub, three wings being usually employed, whereby in cross-section the pulley will be of trefoil shape. The side faces of the wings are concaved, as is likewise the hub between the wings; thus the outer surface of the pulley between the wings will be decidedly concaved, as shown in Fig. 3. Each wing is enlarged at its outer end, the enlargement extending practically from top to bottom, whereby shoulders 12 are formed, and these shoulders are ordinarily rounded off. A bore 13 is produced in the hub, extending through from one end to the other; and preferably in the lower part of each wing a recess 14 is produced in its outer edge, the recess being longitudinal and extending through from one side of the wing to the other. Each recess is formed with a depression 15 in its vertical wall, the depression being semicircular, and the said vertical walls of the recesses below the depressions 15 are beveled or inclined downwardly and outwardly, as shown at 16 in Fig. 2. The wall of the recess above the depression may be oppositely inclined, and ordinarily is so inclined. In the bottom wall of each wing-recess 14 a decided concavity or channel 18 is made, of sufficent depth to receive a clothes-line.

A hanger 19 is employed to carry the pulley. This hanger comprises a vertical section or member 19$^a$, which passes through the bore of the pulley, and extends out beyond the bottom, the projecting end being threaded to receive a nut 20. The vertical member 19$^a$, which may be termed a "spindle member," is connected with an angular body member 19$^b$, whereby the hanger is somewhat U-shaped, one limb being longer than the other, and the said limb 19$^b$ is preferably provided with an eye 21 to receive a stud 22, secured upon a bracket 23, which is driven into or attached to the wall of a house, a window-frame, or to the clothes-pole.

In operation, the clothes-line 24 is passed around the opposing pulleys and made to enter the concavities 15 in the wings; and when the line is tight it will remain in this position in the cavities, and the line may be moved by drawing upon one of its stretches, thereby rotating the pulleys, and in the event the line should become loosened in any manner, as shown in dotted lines in Fig. 2, the line will drop down the inclined surfaces 16 and will enter the channels 18 in the pulley, which will serve to prevent the line from leaving the pulley. Thus when the line contracts it will slide up the inclined surface to the channels 15 of the pulley, and when the line expands it will drop to the bottom, but not off from the pulley. Owing to the concaved side faces of the pulley between its wings, the clothes-pins on the line will readily move around the pulley, as is also shown in dotted lines in Fig. 2, when the line is manipulated, and will readily ride over the enlarged surfaces of the wings and their shoulders 12, the pins being of sufficient length to bridge the recesses 14 in the wings.

Having thus described my invention, what

I claim as new, and desire to secure by Letters Patent, is—

1. A pulley, the same comprising a hub and wings radiating therefrom, each of the said wings being provided with a longitudinal recess having a channel in its vertical and its bottom wall, as and for the purpose specified.

2. A pulley, comprising a hub and wings radiating from the hub, the outer faces of the pulley between the wings and the side faces of the wings being concaved, each of the said wings being provided with a longitudinal recess in its outer edge, the said recess having a channel in its vertical and its bottom wall, substantially as shown and described.

3. A pulley, comprising a hub, wings radiating from the hub, each wing having an enlarged outer edge and a longitudinal recess produced in the enlarged portion and having a depression in its bottom wall and a depression in its vertical wall, the said vertical wall of each recess inclining downwardly and outwardly from said depression therein to the depression in the bottom wall of the recess, as and for the purpose set forth.

4. A pulley, the same comprising a hub and wings radiating from the hub, the outer face of the pulley between the wings being concaved and each wing being provided with a longitudinal recess having a depression in its bottom wall and a depression in its vertical wall, the vertical walls of the recesses being inclined in opposite directions from the said depressions therein, substantially as shown and described.

5. A clothes line pulley comprising a hub, wings radiating from the hub, each wing having an enlarged outer end, and a recess produced in the enlarged portion, having a depression in its vertical and in its lower wall, and a hanger upon which the pulley revolves, as and for the purpose specified.

JOHAN JAKOB LEUZINGER.

Witnesses:
ALVIN CONKLIN,
HIRAM WILLARD CONKLIN.